United States Patent [19]

Imai et al.

[11] 4,335,015

[45] Jun. 15, 1982

[54] CATALYST COMPONENT FOR POLYMERIZATION OF ALPHA-OLEFINS AND METHOD OF USING IT

[75] Inventors: Masafumi Imai, Ooi; Hiroshi Ueno, Namekawa; Naomi Inaba, Ooi, all of Japan

[73] Assignee: Toa Nenryo Kogyo Kabushiki Kaisha, Tokyo, Japan

[21] Appl. No.: 161,978

[22] Filed: Jun. 23, 1980

[30] Foreign Application Priority Data

Jul. 25, 1979 [JP] Japan .................................. 54/93681

[51] Int. Cl.³ .................................................. C08F 4/64
[52] U.S. Cl. ................................ 252/429 B; 526/125
[58] Field of Search ........... 252/429 B, 431 R, 431 C, 252/431 N, 431 P

[56] References Cited

U.S. PATENT DOCUMENTS

| | | | |
|---|---|---|---|
| 3,094,568 | 6/1963 | Hay et al. | 252/429 B X |
| 4,242,230 | 12/1980 | Veno et al. | 252/429 B |
| 4,246,136 | 1/1981 | Veno et al. | 252/429 B |
| 4,253,984 | 3/1981 | Imai et al. | 252/429 B |

FOREIGN PATENT DOCUMENTS

| | | |
|---|---|---|
| 2326429 | 4/1977 | France. |
| 52-65592 | 5/1977 | Japan. |
| 1536358 | 12/1978 | United Kingdom. |
| 1542224 | 3/1979 | United Kingdom. |

*Primary Examiner*—Patrick Garvin
*Attorney, Agent, or Firm*—M. B. Kurtzman

[57] ABSTRACT

A supported titanium catalyst, adaptable for use in the polymerization of alpha-olefins, is produced by treating a supported titanium-containing solid obtained by co-pulverization of a magnesium halide, a tetravalent titanium halide which may also comprise an electron donor compound and/or a halogen compound with an organohalogen compound. The component is thereafter treated with an organoaluminum compound and an electron donor compound. The resulting supported titanium catalyst, one employed as a titanium component with an organoaluminum catalyst component results in a catalyst system useful for the polymerization of alpha-olefins and particularly alpha-olefins.

26 Claims, No Drawings

4,335,015

CATALYST COMPONENT FOR POLYMERIZATION OF ALPHA-OLEFINS AND METHOD OF USING IT

BACKGROUND OF THE INVENTION

This invention relates to a catalyst component for polymerization of alpha-olefins, and to a method of polymerizing alpha-olefins using said component. More specifically, this invention relates to a carrier-supported titanium catalyst component obtained by an improved method of preparation, and to a method for producing stereospecific homopolymers or copolymers of alpha-olefins using a catalyst composed of said catalyst component and an organoaluminum compound.

In the conventional stereospecific polymerization of alpha-olefins, solid $TiCl_3$ is used as a catalyst component. Since only a part of titanium is utilized as catalyst, the catalytic efficiency has not been sufficiently high as to permit omission of a deashing step.

On the other hand, a method which involves dispersing and supporting a titanium compound on another solid is known as a desirable method for increasing polymerization activity per unit weight of titanium. In recent years various improved methods have been suggested about the stereospecific polymerization of alpha-olefins with a catalyst composed of a supported titanium catalyst component and an organoaluminum compound.

These improved methods are roughly classified by the method of supporting titanium, i.e., (I) copulverization of a carrier and a titanium halide, and (II) slurry supporting comprising suspending a carrier in a titanium halide and heating the suspension.

Examples of (I) include a method which comprises using a catalyst composed of a titanium catalyst component obtained by copulverizing an anhydrous magnesium dihalide and a tetravalent titanium halide or a complex of tetravalent titanium halide with an electron donor compound, and an organoaluminum catalyst component consisting of an organoaluminum compound and an electron donor compound (for example, Japanese Laid-Open Patent Publication Nos. 16986/73, 16987/73 and 16988/73); a method which comprises using a catalyst composed of a titanium catalyst component obtained by adding a halogenated silane to a magnesium alkoxide, a titanium tetrahalide and an electron donor compound and copulverizing them, and an organoaluminum catalyst component consisting of an organoaluminum compound and an electron donor compound (Japanese Laid-Open Patent Publication No. 98076/77).

The use of such catalyst systems has the advantage that the titanium compound can be effectively utilized, and the handling of these catalyst systems is convenient. However, it has the disadvantage that long periods of time are required for pulverization. Furthermore, as described in Japanese Laid-Open Patent Publication No. 16986/73, the surface area of the supported titanium catalyst component is small, and in order to omit steps of deashing and removing amorphous polymer, the results obtained are still unsatisfactory in regard to a balance between polymerization activity and stereospecificity.

Examples of (II) are a method which comprises using a catalyst composed of a supported titanium catalyst component, an organoaluminum compound and an electron donor compound, said supported titanium catalyst component being obtained by ball-milling an anhydrous magnesium halide and an electron donor compound (and a silicon compound) and contacting the resulting copulverization product with a titanium halide under heating to support titanium (Japanese Laid-Open Patent Publication No. 151691/77); a method comprising using a catalyst composed of a titanium catalyst component and an organoaluminum catalyst component, said titanium catalyst component being obtained by co-pulverizing an anhydrous magnesium halide and an electron donor compound, together with a halogenated silane (Japanese Laid-Open Patent Publications Nos. 108385/75 and 98076/77), polysiloxane (Japanese Laid-Open Patent Publication No. 20297/76) or a tin or germanium compound (Japanese Laid-Open Patent Publication No. 87489/77) prior to slurry supporting of titanium.

The methods (II) have the advantage that in catalyst preparation, supporting of titanium does not require a long period of time. On the other hand, since a large excess of titanium halide is used, they have the industrial disadvantage that steps of recovery thereof, purification, etc. are necessary. In addition, the polymerization of alpha-olefins using the aforesaid catalyst systems, especially in the presence of a molecular weight controlling agent, still poses many problems both in regard to polymerization activity and stereospecificity.

The present inventors continued extensive investigations in order to solve the aforesaid problems, and previously achieved this purpose by providing a supported titanium catalyst component obtained by (a) subjecting a magnesium halide, a tetravalent titanium halide and an organic ester to co-pulverization and/or contact treatment and heat-treating the product together with a hydrocarbon and/or a halogen-containing compound, or (b) subjecting a magnesium halide, a tetravalent titanium halide, an organic ester and a halogen-containing compound to co-pulverization and/or contacting treatment and heat-treating the product together with a hydrocarbon and/or a halogen-containing compound; and a method for polymerizing alpha-olefins characterized by using a catalyst composed of such a titanium catalyst component and an organoaluminum component consisting of an organoaluminum compound and an organic acid ester U.S. Pat. No. 4,242,230 of Ueno et al, issued Dec. 30, 1980 and U.S. Pat. No. 4,246,136 of Ueno et al, issued Jan. 20, 1981.

SUMMARY OF THE INVENTION

In accordance with this invention it has been discovered that by contacting a solid component containing a magnesium halide and a titanium halide and treated with a halogen compound with a mixture of an organoaluminum compound and an electron donor compound, the absolute amounts of the organoaluminum compound and electron donor compound used during the preparation of the catalyst component and during the polymerization of alpha-olefins can be reduced. This discovery has led to the present invention.

The gist of the present invention lies in a catalyst component for polymerization of alpha-olefins which is prepared by contacting a solid component containing a magnesium halide and a titanium halide and treated with a halogen compound, with a mixture composed of an organoaluminum compound and an electron donor compound; and a method for polymerizing alpha-olefins which comprises homopolymerizing an alpha-olefin or copolymerizing it with ethylene or another alpha-olefin in the presence of a catalyst formed of said catalyst component and an organoaluminum compound.

The solid component used in this invention may be any which contains a magnesium halide and a titanium halide and is obtained by treatment with a halogen compound. However, particularly, solid components obtained by subjecting (I) a system composed of a magnesium halide, a tetravalent titanium halide and an electron donor compound and (II) a system composed of a magnesium halide, a tetravalent titanium halide, an electron donor compound and a halogen compound, respectively, to co-pulverization and/or contacting treatment and treating the resulting titanium-containing solids with a halogen compound produce a marked effect.

DETAILED DESCRIPTION OF THE INVENTION

The individual components used in the preparation of the solid component of this invention are described below.

A magnesium dihalide is especially desirable as the magnesium halide used in the preparation of the solid component of this invention. Usually, $MgCl_2$, $MgBr_2$ or $MgI_2$ is suitable, and $MgCl_2$ is preferred among them. These magnesium halides may be those which are synthesized by any method, and commercially available grades may safely be used. Desirably, the magnesium halide is as anhydrous as possible, and prior to use, it is preferably subjected to a dehydrating treatment, for example, to calcination under reduced pressure at a temperature of about 100° C. to 400° C. for 1 to 10 hours. The inclusion of water to an extent which does not substantially affect the catalyst performance is permissible.

A tetravalent titanium halide is desirable as the titanium halide used in the preparation of the solid component of this invention. Typical examples are $TiCl_4$, $TiBr_4$ and $TiI_4$. However, not all of anions need to be halogen. The halogen anions may be partly replaced by, for example, an alkoxy group, an acyloxy group or an alkyl group.

As the electron donor compound used in the preparation of the solid component of this invention, there can be cited organic carboxylic acids, organic carboxylic acid esters, alcohols, ethers, ketones, amines, amides, nitriles, aldehydes, alcoholates, compounds of phosphorus, arsenic and antimony bonded to an organic group through carbon or oxygen, phosphoamides, thioethers, thioesters and carbonic acid esters. Of these, the organic acid esters are preferably used.

The organic acid esters are esters formed by condensation of saturated or unsaturated aliphatic, alicyclic or aromatic mono- or polycarboxylic acids with aliphatic, alicyclic or araliphatic mono- or polyols. Specific examples are butyl formate, ethyl acetate, butyl acetate, ethyl acrylate, ethyl butyrate, isobutyl isobutyrate, methol methacrylate, diethyl maleate, diethyl tartrate, ethyl hexahydrobenzoate, ethyl benzoate, ethyl p-methoxybenzoate, methyl p-methylbenzoate, ethyl p-tertbutylbenzoate, dibutyl phthalate, diallyl phthalate, and ethyl alpha-naphthoate. The ester, however, is not limited to these specific examples. Of these, alkyl esters of aromatic carboxylic acids, especially $C_1$–$C_8$ alkyl esters of benzoic acid or ring-substituted benzoic acids such as p-methylbenzoic acid or p-methoxybenzoic acid are preferred.

The halogen compound (to be referred to as the aforesaid halogen compound) used in the preparation of the solid component of this invention is selected from organic halogen compounds and halogen-containing compounds of elements of Group IVa of the periodic table other than carbon. Typical organic halogen compounds are mono- or polyhalogen substituted products of saturated or unsaturated aliphatic, alicyclic and aromatic hydrocarbons. Illustrative of the aliphatic compounds are, for example, methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methyl chloroform, methyl bromoform, methyl iodoform, 1,1,2-trichloroethylene, 1,1,2-tribromoethylene, 1,1,2,2-tetrachloroethylene, pentachloroethane, hexachloroethane, hexabromoethane, n-propyl chloride, 1,2-dichloropropane, hexachloropropylene, octachloropropane, decabromobutane and chlorinated paraffin. Illustrative of the alicyclic compounds are, for example, chlorocyclopropane, tetrachlorocyclopentane, hexachloropentadiene and hexachlorocyclohexane. Illustrative of the aromatic compounds are, for example, chlorobenzene, bromobenzene, o-dichlorobenzene, p-dichlorobenzene, hexachlorobenzene, hexabromobenzene, benzotrichloride and p-chlorobenzotrichloride.

In addition to the halo-substituted hydrocarbons, halo-substituted oxygen-containing compounds such as hexachloroacetone, chloroacetic acid esters and trichloroacetic acid esters may also be used. Of these, polyhalogen-substituted products of aliphatic hydrocarbons, especially polychloro-substituted products thereof, are preferred, and, for example, carbon tetrachloride, 1,1,2-trichloroethylene, 1,1,2,2-tetrachloroethane, hexachloroethane, octachloropropane, etc. are most preferred.

Examples of the halogen-containing compounds of the elements of Group IVa of the periodic table other than carbon are halogen compounds of silicon, germanium, tin and lead or the homologs or other compounds thereof.

Typical halogen-containing compounds of silicon are represented by the general formula $Si_mX_{2m+2}$ (X is halogen, and m is usually an integer of 1 to 10). Specifically, they are polyhalosilanes such as tetrahalosilanes, hexahalodisilanes, octahalotrisilanes, decahalotetrasilanes, dodecahalopentasilanes, tetradecahalohexasilanes and docosahalodecasilanes. In these polyhalopolysilanes, the halosilane atoms may be identical or different. Among these, preferred compounds are tetrahalosilanes corresponding to m=1. Examples of the tetrahalosilanes are tetrachlorosilane, tetrabromosilane, tetraiodosilane, trichlorobromosilane, trichloroiodosilane, trichlorofluorosilane, dichlorodibromosilane, dichlorodiiodosilane, chlorotribromosilane, chlorotriiodosilane and tribromoiodosilane. Tetrachlorosilane is most preferred, as it is easily available.

The halogens of the aforesaid halosilane homolog compounds may be partly substituted by one or a plurality of alkyl, aryl, aralkyl, vinyl, alkoxy and acyl groups.

Typical halogen compounds of germanium are represented by $GeX_m$ (X represents halogen, and m represents an integer of 2 or 4). Specific examples include $GeCl_2$, $GeBr_2$, $GeI_2$, $GeCl_4$, $GeBr_4$ and $GeI_4$. Of these $GeCl_2$ and $GeCl_4$ are preferred. The halogens of the aforesaid halo-germanium compounds may be partly substituted by one or a plurality of alkyl, aryl, aralkyl, vinyl, alkoxy and acyl groups.

Typical halogen compounds of tin are represented by $SnX_n$ (X, and m are the same as above), and specific examples are $SnCl_2$, $SnBr_2$, $SnI_2$, $SnCl_4$, $SnBr_4$, $SnI_4$, $SnCl_3Br$, $SnCl_2Br_2$, $SnBr_3Cl$ $SnBr_2I_2$ and $SnCl_2I_2$. Of these, $SnCl_2$ and $SnCl_4$ are preferred. The halogens of the aforesaid halotin compounds may be partly substituted by one or a plurality of alkyl, aryl, aralkyl, vinyl, alkoxy and acyl groups.

Typical halogen compounds of lead are represented by $PbX_m$ (X and m are the same as above). Specific examples include $PbCl_2$, $PbCl_4$, $PbBr_2$, $PbBr_4$, $PbI_2$ and $PbI_4$. Of these, $PbCl_2$ and $PbCl_4$ are preferred. The halogens of the aforesaid halo-lead compounds may be partly substituted by one or a plurality of alkyl, aryl, aralkyl, vinyl, alkoxy and acyl groups.

Among the aforesaid halogen compounds cited, the organic halogen compounds and halogenated silane compounds are most preferably used. These various halogen compounds may be used singly or in combination of two or more. Mixtures of the aforesaid halogen compounds with hydrocarbons described below may also be used.

Hydrocarbons that can be used in the preparation of the solid component in this invention are, for example, aliphatic hydrocarbons having 3 to 20 carbon atoms such as propane, butane, isobutane, pentane, n-hexane, n-heptane, isooctane, decane and liquid paraffin; alicyclic hydrocarbons having 5 to 12 carbon atoms such as cyclopentane, cyclohexane, methylcyclohexane, ethylcyclohexane, decalin and dimethyldecalin; aromatic hydrocarbons having 6 to 12 carbon atoms such as benzene, toluene, o-xylene, p-xylene, m-xylene, mixed xylene, ethylbenzene, dimethylnaphthalene and tetralin, and also gasoline and kerosene, all of which are dehydrated in a customary manner.

In accordance with the invention the titanium-containing solid is preferably obtained by subjecting (I) (a) an anhydrous magnesium halide, (b) a tetravalent titanium halide and (c) an electron donor compound, or (II) (a) an anhydrous magnesium halide, (b) a tetravalent titanium halide, (c) an electron donor compound and (d) the aforesaid halogen compound, to co-pulverization and/or contacting treatment by various methods. Specifically, it can be produced by variously selecting the sequence and method of addition and contacting these compounds, but ultimately, all of these compounds need to contact each other. Preferably, the co-pulverization and/or contacting treatment is carried out on systems having the following combinations of these compounds. Especially preferably, such a treatment is carried out by mechanical pulverization by a vibratory mill, a ball mill, etc.

In the case of (I):

(i) a system composed of a mixture of (a), (b) and (c);

(ii) a system composed of a mixture of (b) with a complex (d) prepared in advance from (a) and (c);

(iii) a system composed of a mixture of (a) with a complex (e) prepared in advance from (b) and (c);

(iv) a mixture of (d) and (e). In the case of (II):

(i) a system composed of a mixture of (a), (b), (c) and (d).

(ii) a system composed of a mixture of (b) and (d) with a complex (e) prepared in advance from (a) and (c);

(iii) a system composed of a mixture of (a) and (d) with a complex (f) prepared in advance from (b) and (c);

(iv) a mixture of (b) and (c) with a complex (g) prepared in advance from (a) and (d);

(v) a mixture of (f) and (g);

(vi) a mixture of (e), (f) and (d);

(vii) a mixture of (a), (f) and (d); and (viii) a mixture of (d) with a complex (h) prepared in advance from (a) and (f).

A suitable selection can be made from the above-exemplified combinations. In the above exemplification, the method for preformation of a complex is preferably selected from wet or dry mechanical pulverization treatment, and contacting treatment at room temperature or under heating in the presence or absence of a solvent. The mixture not only denotes mixing at one time, but also includes successive additions in a suitable sequence. The efficiency of mechanical pulverization differs depending not only upon the method and the structure of the apparatus, but also upon the amounts, void ratio and temperature of the raw materials charged. In the present invention, when anhydrous magnesium chloride is used as the magnesium halide carrier, it is necessary to perform pulverization until there is a change in the intensities of the peaks at 14.8° (strong) and 30.2° (medium) among the characteristic peaks ($2\theta$ values) in an X-ray diffraction (45 KV×45 mA, $CuK_d$ ray source, Ni filter) of anhydrous magnesium chloride. Preferably, the extent of pulverization is continued until the peak at 14.8° becomes dull and broadened and the peak intensity at 30.2° is drastically reduced. When 10 to 50 g of the materials to be pulverized are charged into a vibratory mill having an inner capacity of 300 ml and containing 100 steel balls having a diameter of 10 mm with an amplitude of 1 to 3 mm and oscillation cycles of 1400 vpm, the pulverization time is usually selected within the range of 1 to 200 hours, preferably 10 to 100 hours.

The proportion of the titanium halide supported on the carrier is desirably 0.1 to 10% by weight as titanium metal. The electron donor compound is used in an amount of 0.1 to 10 moles, preferably 0.5 to 5 moles, per gram atom of the titanium metal deposited. The aforesaid halogen compounds are used in an amount in the range of 1 to 100% by weight, preferably 5 to 50% by weight, based on the anhydrous magnesium halide.

It is noteworthy that by such a method, the complex composed of (a), (b) and (c) and the complex composed of (a), (b), (c) and (d) are obtained as dry, non-sticky solids, even if the aforesaid halogen compound used is a liquid. The resulting titanium-containing solids have a surface area of as small as 10 $m^2/g$ at the largest and a pore volume of less than 0.05 cc/g.

The activating treatment of the titanium-containing solid which is a starting solid in this invention is described below. Such an activating treatment is achieved by using at least one aforesaid halogen compound. The aforesaid halogen compound may be used in combination with a hydrocarbon. The aforesaid halogen compound and the hydrocarbon may be properly selected from those described hereinabove.

The aforesaid halogen compound may be identical with, or different from, that used in the preparation of the titanium-containing solid. Desirably, the aforesaid halogen compound and hydrocarbon are subjected to dehydration treatment in a customary manner prior to use. The activating treatment of the titanium-containing solid with the aforesaid halogen compound or a mixture of it with the hydrocarbon is preferably carried out in an atmosphere of an inert gas such as nitrogen.

The amount of the aforesaid halogen compound (optionally including the hydrocarbon) used in the activating treatment of the titanium-containing solid can be selected within a wide range. Usually, it is selected within the range of 0.5 to 50 times the weight of the titanium-containing solid. The temperature at which the activating treatment is carried out may be room temperature. Usually, it is selected within the range of 40° to 200° C., preferably 60° to 150° C. In particular, when the substance for treatment has a low boiling point and is required to be treated at high temperature, the treatment can be suitably carried out by utilizing an air-tight pressure vessel such as an autoclave. The treating time can also be selected within a broad range, but usually periods of 0.5 to 20 hours, preferably 1 to 5 hours, are used. After the treatment is over, the solution is filtered at a temperature slightly lower than the treating temperature. The resulting solid, while being maintained at this temperature, is washed several times with a fresh hydrocarbon solvent such as n-heptane, and then dried under reduced pressure. Such a treatment results in extraction of mainly the titanium halide and a part of the electron donor compound from the titanium-containing solid, and its composition changes. Selectivity of extraction can vary also with the substance for treatment.

The supported titanium catalyst component obtained by the activating treatment undergoes a great change in properties. Pores not existing before the treatment now come into being, and its surface area and pore volume increase strikingly. In X-ray diffraction (50 KV×45 mA, CuK$_\alpha$ ray, Ni filter), some of the characteristic absorptions of the starting anhydrous magnesium halide lose sharpness, decrease in intensity and increase in width in the titanium-containing solid obtained by mechanical pulverization, and some peaks disappear. However, in the supported titanium catalyst component obtained by performing the activating treatment by the method of this invention, the peaks which have lost sharpness, decreased in intensity and increased in width somewhat regain sharpness, and the peaks which have disappeared are partly restored. This change is construed to mean that a carrier-supported titanium catalyst component having quite different properties from those before the treatment is formed.

Such a marked modifying effect cannot be obtained by merely heat-treating the titanium-containing solid obtained by mechanical pulverization, etc.

The present invention is achieved by contacting the starting solid component so obtained with a mixture of an organoaluminum compound and an electron donor compound.

The organoaluminum, used together with the electron donor compound, is represented by the general formula $R_nAlX_{3-n}$ (wherein R represents an alkyl or aryl group, X represents halogen, an alkoxy group or hydrogen, and n is any number in the range of $1 \leq n \leq 3$). For example, alkyl aluminum compounds having 1 to 18 carbon atoms, preferably 2 to 6 carbon atoms, such as trialkyl aluminums, dialkyl aluminum monohalides, monoalkyl aluminum dihalides, alkyl aluminum sesquihalides, dialkyl aluminum monoalkoxides and dialkyl aluminum monohydrides, or the mixtures or complexes thereof are especially desirable. Specifically, examples of the trialkyl aluminums are trimethyl aluminum, triethyl aluminum, tripropyl aluminum, triisobutyl aluminum and trihexyl aluminum; examples of the dialkyl aluminum monohalides are dimethyl aluminum chloride, diethyl aluminum chloride, diethyl aluminum bromide, diethyl aluminum iodide and diisobutyl aluminum chloride; examples of the monoalkyl aluminum dihalides are methyl aluminum dichloride, ethyl aluminum dichloride, ethyl aluminum dibromide, ethyl aluminum diiodide and isobutyl aluminum dichloride; an example of the alkyl aluminum sesquihalide is ethyl aluminum sesquichloride; examples of the dialkyl aluminum monoalkoxide are dimethyl aluminum methoxide, diethyl aluminum ethoxide, diethyl aluminum phenoxide, dipropyl aluminum ethoxide, diisobutyl aluminum ethoxide and diisobutyl aluminum phenoxide; and examples of the dialkyl aluminum hydrides include dimethyl aluminum hydride, diethyl aluminum hydride, dipropyl aluminum hydride and diisobutyl aluminum hydride. In particular, triethyl aluminum, triisobutyl aluminum, diethyl aluminum monochloride, ethyl aluminum dichloride, ethyl aluminum sesquichloride, diethyl aluminum ethoxide and diethyl aluminum hydride, or the mixtures or complexes thereof are desirable because they are easily available commercially and exhibit excellent effects.

The electron donor compounds used together with the organoaluminum compounds in this invention include those employed in the initial step of preparing the titanium-containing solid. Of those electron donor compounds previously listed herein, the organic acid esters are preferably used. Of these, alkyl esters of aromatic carboxylic acids, especially $C_1$-$C_8$ alkyl esters of benzoic acid or ring-substituted benzoic acids such as p-methylbenzoic acid and p-methoxybenzoic acid are preferred.

The treatment of the solid component of this invention with the mixture of the organoaluminum compound and the electron donor compound (especially the organic ester) may be carried out, for example, by subjecting the supported titanium-containing solid and the mixture to contacting treatment by mechanical co-pulverization using a ball mill, a vibratory mill, etc., or by a slurry method in which the two are contacted with each other in the presence of an inert hydrocarbon such as n-heptane. These contacting treatments may be performed by contacting the supported titanium-containing solid and the mixture together from the outset, or by contacting them while adding one (especially, the mixture) to the other (especially the supported titanium-containing solid). The contacting treatment exhibits its effect when usually carried out at room temperature for 5 minutes to 3 hours in the case of mechanical co-pulverization, or for 1 to 10 hours in the case of the slurry method. The contacting time may be increased or decreased as required, and it can also be carried out under heating.

The mixing ratio between the organoaluminum compound and the electron donor compound (especially the organic acid ester) is such that the proportion of the organoaluminum compound is usually 0.05 to 2.0 moles, preferably 0.1 to 1.0 mole, per mole of the electron donor compound.

The amount of the aforesaid mixture used to the supported titanium-containing solid is desirably such that the organoaluminum compound is used in a proportion of 0.1 to 2.0 moles per mole of titanium in the supported titanium-containing solid.

The supported titanium catalyst component so obtained, in combination with an organoaluminum compound, exhibits the property of being highly active and giving high stereospecificity in the homopolymerization of alpha-olefin or in the copolymerization of it with ethylene or another alpha-olefin.

Organoaluminum compounds employed as the co-catalyst during the polymerization reaction are selected from the aforesaid organoaluminum compounds used in the treatment of contacting the solid component with a mixture of the organoaluminum compound and electron donor compound. Of these, trialkyl aluminums are especially desirable, and examples thereof are triethylaluminum and triisobutyl aluminum. Furthermore, these trialkyl aluminums may be used in combination with other organoaluminum compounds. Specific examples thereof are diethyl aluminum chloride, ethyl aluminum dichloride, ethyl aluminum sesquichloride, diethyl aluminum ethoxide and diethyl aluminum hydride, or the mixtures or complexes thereof, which are desirable because they are readily available commercially and exhibit excellent effects.

The amount of the organoaluminum compound employed during the polymerization reaction based on the supported titanium catalyst component is usually 1 to 100 moles, desirably 10 to 50 moles, per mole of titanium in the supported titanium catalyst component. This amount is far smaller than the amounts usually required in the prior inventions of the present inventors, i.e., at least 100 moles, and mostly 300 moles, and here lies one characteristic feature of the present invention. It is possible to use the organoaluminum compound in admixture with the electron donor compound such as organic acid esters, but scarcely any effect by the addition is noted. Another characteristic feature of this invention is that the organic acid ester which is essential in the prior suggested invention need not be used.

The present invention is directed to the polymerization of olefins using a catalyst composed of the supported titanium catalyst component obtained in the above manner and an organoaluminum compound. In particular, this catalyst exhibits excellent performance when used in the stereospecific polymerization of propylene, butene-1, 4-methylpentene-1 and hexene-1 and the copolymerization of these alpha-olefins with each other and/or ethylene. The copolymerization includes both random and block copolymerizations. When ethylene is used as a comonomer, its amount is up to 30% by weight, especially 1 to 15% by weight, based on the alpha-olefin. The conditions for performing the polymerization reaction with the catalyst system of this invention are the same as those which are usually employed.

The reaction may be carried out in the gaseous phase or the liquid phase. The liquid phase reaction may be performed either in an inert hydrocarbon or liquid monomer. When the polymerization is carried out in solvent, suitable solvents are selected from the aforesaid inert hydrocarbons. The polymerization temperature is usually from −80° C. to 150° C., preferably from 40° C. to 100° C. The pressure may, for example, be from 1 to 40 atmospheres. The control of the molecular weight of the polymer during the polymerization is carried out by known methods which involve the presence of hydrogen or other known molecular weight controlling agents. The method of polymerization may either be continuous or batchwise.

When an alpha-olefin is polymerized by the process of this invention, the stereospecificity can be greatly improved and the amounts of polymer formed per unit weight of titanium in the polymerization catalyst and per unit weight of the polymerization catalysts are large, even when the amount of the organoaluminum compound used as a promoter is drastically reduced as compared with the case of the prior inventions. Accordingly, both a step of removing atactic polymer and a step of removing the catalyst becomes unnecessary, or at least the amounts can be markedly reduced. Thus, an industrially excellent process is provided.

The process of this invention is especially important for the production of isotactic polypropylene, a random copolymer of ethylene and propylene, and a block copolymer of propylene and ethylene.

The following Examples specifically illustrate the present invention. The invention, however, is not intended to be limited by these Examples alone. All percentages (%) shown in the Examples are by weight unless otherwise specified. The polymerization activity Kc is the amount (g) of polymer formed per gram of catalyst. Kt is the amount (kg) of polymer per gram of Ti. The heptane-insoluble portion (to be abbreviated as H.I. hereinbelow), which shows the proportion of crystalline polymer in the polymer, denotes the residual amount of polymer when it is extracted for 6 hours with boiling n-heptane in a modified Soxhlet extractor. The melt flow rate (MFR) was measured in accordance with ASTM-D1238.

EXAMPLE 1

Preparation of a solid component

A 1-liter stainless steel (SUS 32) mill pot containing 340 stainless steel (SUS 32) balls each having a diameter of 10 mm was charged under a nitrogen atmosphere with 100 g of substantially anhydrous magnesium chloride, 39.9 g of an equimolar complex of titanium tetrachloride and ethyl benzoate (to be abbreviated as EB), and 32 g of hexachloroethane, and mounted on a vibrator. The pot was thus vibrated to perform co-pulverization of these materials for 15 hours to afford a titanium-containing solid (S-1). The solid (S-1) contained 2.6% of titanium and 15.2% of magnesium as atoms.

A 1-liter flask was charged with 156.6 g of solid (S-1) in an atmosphere of nitrogen, and 226.5 g of hexachloroethane (equimolar to magnesium atom in the solid (S-1)) and 150 ml of mixed xylene were added. They were treated with stirring at 120° C. for 2 hours. Subsequently, the product was filtered at 120° C., and the resulting solid was washed six times with 500 ml of n-heptane at 65° C., and then dried under reduced pressure at the same temperature to obtain a solid component (S-2). The solid component (S-2) contained 1.5% of titanium and 23.5% of magnesium as atoms.

Preparation of a catalyst component

Under a nitrogen atmosphere, 46 ml of n-heptane was charged into a 100 ml glass vessel, and 5 g of the solid component (S-2) obtained by the aforesaid method was added and suspended therein. To the suspension was added a mixture obtained by mixing 0.31 g of triisobutyl aluminum (to be abbreviated TIBAL) corresponding to 1.0 aluminum atom per gram atom of titanium in the solid component (S-2) and 0.47 g of EB corresponding to 2 moles per mole of TIBAL, and maintaining the mixture for 5 minutes. The mixture was stirred at room temperature for 30 minutes to disperse the individual ingredients uniformly to obtain a slurry-like catalyst component (S-3). This catalyst component contained 1.5% of titanium calculated as atom.

Polymerization of propylene

A 1-liter stainless steel (SUS 32) autoclave equipped with a stirrer was charged under a nitrogen atmosphere with a glass ampoule containing 100 mg of the catalyst component (S-3) sealed therein, and an n-heptane solution containing 0.1 mole of triethylaluminum (to be abbreviated as TEAL hereinbelow) in 1 liter of n-heptane in an amount corresponding to 22 as TEAL per gram atom of titanium. Then, 0.6 liter of hydrogen gas and 0.8 liter of liquefied propylene were introduced under pressure. The autoclave was heated, and when its temperature reached 60° C., the ampoule was broken by the propellers of the stirrer to start polymerization. While maintaining the polymerization system at 68° C., propylene was polymerized for 30 minutes. After the polymerization, the unreacted propylene was purged to afford 256 g of white powdery polypropylene.

The polymerization activity Kc was 2560 g pp/g cat. and Kt was 170 kg pp/g Ti. The polypropylene powder had an H.I. of 91.8% and an MFR of 4.5.

EXAMPLES 2 AND 3

A catalyst component (S-3) was prepared in the same way as in Example 1 except that diethyl aluminum chloride (to be abbreviated as DEAC hereinbelow) (Example 2) or ethyl aluminum dichloride (to be abbreviated as EADC hereinbelow) (Example 3) was used instead of TIBAL as in Example 1. Each catalyst component (S-3) contained 1.5% of titanium calculated as atom.

Using the catalyst component (S-3), propylene was polymerized in the same way as in Example 1. The results are shown in Table 1.

TABLE 1

| Example | Kc (g · pp/g · cat) | Kt (kg · pp/g · Ti) | HI (%) | MFR (g/10 min.) |
|---|---|---|---|---|
| 2 | 2150 | 143 | 91.8 | 5.3 |
| 3 | 1920 | 128 | 90.0 | 3.8 |

EXAMPLE 4

Preparation of a catalyst component 34.8 g of the solid component (S-2) obtained in Example 1, 2.2 g of TIBAL corresponding to 1.0 as aluminum atom per gram atom of titanium in the solid component (S-2), and 3.3 g of EB corresponding to 2 moles per mole of TIBAL were mixed and maintained for 5 minutes. The resulting mixture was charged into the same mill pot as used in Example 1 in the preparation of the titanium-containing solid (S-1). The pot was mounted on a vibrator, and vibrated for 6 minutes to obtain a catalyst component (S-4). This catalyst component contained 1.1% of titanium calculated as atom.

Polymerization of propylene

The same autoclave as used in Example 1 was charged under a nitrogen atmosphere with 107.6 mg of the catalyst component (S-4), and an n-heptane solution containing 0.1 mole of TEAL in 1 liter of n-heptane, the amount of which solution corresponded to 22 as TEAL per gram atom of titanium in the catalyst component (S-4). Then, 0.6 liter of hydrogen gas and 0.8 liter of liquefied propylene were introduced under pressure. The autoclave was heated, and while maintaining the polymerization system at 68° C., propylene was polymerized for 30 minutes. After the polymerization, the unreacted propylene was purged, and 175.5 g of propylene as a white powder was obtained.

The polymerization activity Kc was 1630 g pp/g cat.; Kt was 148 kg pp/g Ti, H.I. was 91.9%; and MFR was 5.5.

EXAMPLE 5

A catalyst component was prepared in the same way as in Example 4 except that the pulverizing time in the preparation of the catalyst component (S-4) was changed from 6 minutes to 10 minutes. Using the catalyst component, propylene was polymerized. The results were: Kc 1540, Kt 140, H.I. 91.7%, MFR 3.7.

EXAMPLE 6

A catalyst component was prepared in the same way as in Example 4 except that in Example 4, the pulverizing time in the preparation of the catalyst component (S-4) was changed from 6 minutes to 10 minutes, and the Al/EB mole ratio was changed from 0.5 to 0.7. Using the catalyst component, propylene was polymerized. The results were: Kc 2430, Kt 243, H.I. 90.6%, MFR 6.5.

COMPARATIVE EXAMPLES 1 AND 2

Propylene was polymerized in the same way as in Example 4 using the titanium-containing solid (S-1) (Comparative Example 1) and the solid component (S-2) (Comparative Example 2) prepared in Example 1. The results are shown in Table 2.

TABLE 2

| Comparative Example | Kc (g · pp/g · cat) | Kt (kg · pp/g · Ti) | HI (%) | MFR (g/10 min.) |
|---|---|---|---|---|
| 1 | 2600 | 100 | 69.3 | 9.8 |
| 2 | 2700 | 100 | 75.4 | 12.1 |

COMPARATIVE EXAMPLE 3

The same autoclave as used in Example 1 was charged under a nitrogen atmosphere with a mixture obtained by mixing 74.7 mg of the solid component (S-2) prepared in Example 1, an n-heptane solution containing 0.1 mole of TEAL in 1 liter of n-heptane (the amount of which solution corresponded to 23 as TEAL per gram atom of titanium in the solid component (S-2)), and 7.1 mg of EB (which corresponded to 2.0 per gram atom of titanium in the solid component (S-2)) and maintaining the mixture for 5 minutes. Subsequently, in the same way as in Example 4, propylene was polymerized. The results were: Kc 2830, Kt 188, H.I. 86.8%, MFR 3.9.

COMPARATIVE EXAMPLE 4

A catalyst component was prepared in the same way as in Example 1 except that the titanium-containing solid (S-1) was used instead of the solid component (S-2) in preparing the catalyst component (S-3). This catalyst component contained 2.6% of titanium calculated as atom. Using this catalyst component, propylene was polymerized in the same way as in Example 1. The results are shown in Table 3.

COMPARATIVE EXAMPLE 5

A catalyst component was prepared in the same way as in Example 4 except that the titanium-containing solid (S-1) was used instead of the solid component (S-2)

in the preparation of the catalyst component (S-4). This catalyst component contained 2.6% of titanium calculated as atom. Using this catalyst component, propylene was polymerized in the same way as in Example 4. The results are shown in Table 3.

TABLE 3

| Comparative Example | Kc (g · pp/g · cat) | Kt (kg · pp/g · Ti) | HI (%) | MFR (g/10 min.) |
|---|---|---|---|---|
| 4 | 4880 | 188 | 53.0 | 10.9 |
| 5 | 5290 | 203 | 49.5 | 12.8 |

EXAMPLE 7

The same mill pot as used in Example 1 was charged under a nitrogen atmosphere with 120.9 g of substantially anhydrous magnesium chloride and 33.3 g of an equimolar complex of titanium tetrachloride and EB, mounted on a vibrator, and vibrated to perform co-pulverization for 15 hours. Thus a titanium-containing solid (S-5) was obtained. The solid (S-5) contained 2.9% of titanium and 15.2% of magnesium.

120 g of the solid (S-5) was treated with 180 g of hexachloroethane (which was equimolar to magnesium atom in the solid (S-5)) and 150 ml of mixed xylene under the same conditions as in Example 1, and then worked up in the same way as in Example 1 to obtain a solid component (S-6). Then the solid component (S-6) was treated with a mixture of TIBAL and EB under the same conditions as in Example 1 to prepare a catalyst component (S-7). The resulting catalyst component (S-7) contained 1.4% of titanium calculated as atom.

Using this catalyst component (S-7), propylene was polymerized in the same way as in Example 1. The results were: Kc 2380, Kt 170, H.I. 91.0%, MFR 5.5.

EXAMPLES 8 AND 9

A catalyst component was prepared in the same way as in Example 7 except that DEAC (Example 8) or EADC (Example 9) was used instead of TIBAL which was used in the preparation of the catalyst component (S-7) by treating the solid component (S-6) in Example 7. These catalyst components contained 1.4% and 1.4% respectively of titanium calculated as atom. Using each of these catalyst components, propylene was polymerized in the same way as in Example 1. The results are shown in Table 4.

TABLE 4

| Example | Kc (g · pp/g · cat) | Kt (kg · pp/g · Ti) | HI (%) | MFR (g/10 min.) |
|---|---|---|---|---|
| 8 | 2000 | 143 | 90.1 | 4.8 |
| 9 | 1780 | 127 | 90.6 | 3.9 |

COMPARATIVE EXAMPLES 6 AND 7

Propylene was polymerized in the same way as in Example 1 using the titanium-containing solid (S-5) (Comparative Example 6) and the solid component (S-6) (Comparative Example 7) prepared in Example 7 as a catalyst component. The results are shown in Table 5.

TABLE 5

| Comparative Example | Kc (g · pp/g · cat) | Kt (kg · pp/g · Ti) | HI (%) | MFR (g/10 min.) |
|---|---|---|---|---|
| 6 | 2850 | 98 | 57.3 | 14.5 |
| 7 | 2600 | 186 | 60.8 | 9.8 |

EXAMPLE 10

In the same way as in Example 1, a catalyst component was prepared except that pentachloroethane was used instead of hexachloroethane; and propylene was polymerized using the resulting catalyst component. The results were: Kc 2450, Kt 159, H.I. 91.0%, MFR 6.1.

EXAMPLE 11

In the same way as in Example 1, a catalyst component was prepared except that ethyl p-methoxybenzoate was used instead of EB; and using the resulting catalyst component, propylene was polymerized. The results were: Kc 2310, Kt 165, H.I. 92.3%, MFR 3.7.

EXAMPLE 12

A titanium-containing solid was obtained in the same way as in Example 1 except that silicon tetrachloride was used instead of hexchloroethane in the preparation of the solid (S-1), and subsequently by quite the same method, a catalyst component was prepared. Using this catalyst component, propylene was polymerized. The results were: Kc 1900, Kt 130, H.I. 90.5%, MFR 6.1.

What is claimed is:

1. A supported titanium-containing catalyst component adaptable for use in the polymerization of alpha-olefins comprising a solid component which has been co-pulverized with and/or subjected to contacting treatment by forming a slurry in the presence of an inert hydrocarbon with a mixture comprising an organoaluminum compound and an electron donor compound, said solid component comprising co-pulverized and/or slurry contacted magnesium halide and a titanium halide treated under activating conditions with a halogen compound.

2. The catalyst of claim 1 wherein the solid component comprises a magnesium halide, a titanium halide and an electron donor compound.

3. The catalyst component of claim 1 wherein the solid component comprises magnesium halide, a titanium halide, an electron donor compound and a halogen compound.

4. The catalyst component of claim 1 wherein said magnesium halide is anhydrous magnesium dichloride.

5. The catalyst component of claim 1 wherein said titanium halide is titanium tetrachloride.

6. The catalyst component of claim 1 wherein said halogen compound is selected from the group consisting of organo-halogen compounds or halogen containing compounds of the elements of Group IVa of the Periodic Table other than carbon.

7. The catalyst component of claim 6 wherein said halogen compound is in mixture with a hydrocarbon.

8. The catalyst component of claim 6 wherein said organohalogen compound is a polychlorinated hydrocarbon having from 1 to 4 carbon atoms.

9. The catalyst component of claim 2 wherein said electron donor compound is an organic acid ester.

10. The catalyst component of claim 9 wherein said organic acid ester is selected from alkyl esters of aliphatic, alicyclic and aromatic carboxylic acids.

11. The catalyst component of claim 10 wherein the alkyl esters of aromatic carboxylic acids are alkyl esters of mononuclear aromatic carboxylic acids.

12. The catalyst component of claim 11 wherein said alkyl esters of mononuclear aromatic carboxylic acids are alkyl esters of benzoic acid.

13. The catalyst component of claim 7 wherein said hydrocarbon is selected from the group consisting of aliphatic hydrocarbons having from 3 to 20 carbon atoms, alicyclic hydrocarbons having from 5 to 12 carbon atoms and aromatic hydrocarbons having from 6 to 12 carbon atoms.

14. A catalyst system adaptable for use in the polymerization of olefins which comprises:
 (a) an organoaluminum co-catalyst; and
 (b) the titanium-containing catalyst component of claim 1.

15. A catalyst system adaptable for use in the polymerization of olefins which comprises:
 (a) an organoaluminum co-catalyst; and
 (b) the titanium-containing catalyst component of claim 2.

16. A catalyst system adaptable for use in the polymerization of olefins which comprises:
 (a) an organoaluminum co-catalyst; and
 (b) the titanium-containing catalyst component of claim 3.

17. A catalyst system adaptable for use in the polymerization of olefins which comprises:
 (a) an organoaluminum co-catalyst; and
 (b) the titanium-containing catalyst component of claim 4.

18. A catalyst system adaptable for use in the polymerization of olefins which comprises:
 (a) an organoaluminum co-catalyst; and
 (b) the titanium-containing catalyst component of claim 5.

19. A catalyst system adaptable for use in the polymerization of olefins which comprises:
 (a) an organoaluminum co-catalyst; and
 (b) the titanium-containing catalyst component of claim 6.

20. A catalyst system adaptable for use in the polymerization of olefins which comprises:
 (a) an organoaluminum co-catalyst; and
 (b) the titanium-containing catalyst component of claim 7.

21. A catalyst system adaptable for use in the polymerization of olefins which comprises:
 (a) an organoaluminum co-catalyst; and
 (b) the titanium-containing catalyst component of claim 8.

22. A catalyst system adaptable for use in the polymerization of olefins which comprises:
 (a) an organoaluminum co-catalyst; and
 (b) the titanium-containing catalyst component of claim 9.

23. A catalyst system adaptable for use in the polymerization of olefins which comprises:
 (a) an organoaluminum co-catalyst; and
 (b) the titanium-containing catalyst component of claim 10.

24. A catalyst system adaptable for use in the polymerization of olefins which comprises:
 (a) an organoaluminum co-catalyst; and
 (b) the titanium-containing catalyst component of claim 11.

25. A catalyst system adaptable for use in the polymerization of olefins which comprises:
 (a) an organoaluminum co-catalyst; and
 (b) the titanium-containing catalyst component of claim 12.

26. A catalyst system adaptable for use in the polymerization of olefins which comprises:
 (a) an organoaluminum co-catalyst; and
 (b) the titanium-containing catalyst component of claim 13.

* * * * *